US006591937B2

(12) United States Patent
Badenoch et al.

(10) Patent No.: US 6,591,937 B2
(45) Date of Patent: Jul. 15, 2003

(54) ADAPTIVE VARIABLE EFFORT POWER STEERING SYSTEM

(75) Inventors: Scott Wilson Badenoch, Farmington Hills, MI (US); Raymond Kurt Schubert, Mountain View, CA (US); Todd A. Belvo, White Lake, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/007,647

(22) Filed: Dec. 5, 2001

(65) Prior Publication Data

US 2003/0102180 A1 Jun. 5, 2003

(51) Int. Cl.$^7$ ................................................ B62D 5/04
(52) U.S. Cl. ........................................................ 180/446
(58) Field of Search ............................... 180/446, 421, 180/444, 443; 701/41, 42

(56) References Cited

U.S. PATENT DOCUMENTS

| | | | | |
|---|---|---|---|---|
| 4,651,290 A | * | 3/1987 | Masaki et al. ............... 364/550 |
| 5,261,503 A | * | 11/1993 | Ysui ........................... 180/142 |
| 5,365,439 A | * | 11/1994 | Momose et al. ........ 364/424.05 |
| 5,428,536 A | * | 6/1995 | Ackermann ............ 364/424.05 |
| 5,446,657 A | * | 8/1995 | Ikeda et al. ............ 364/424.05 |
| 5,684,700 A | | 11/1997 | Crocker ............... 364/424.051 |
| 5,717,590 A | * | 2/1998 | Mihalko ............... 364/424.051 |
| 5,729,107 A | | 3/1998 | Shimizu et al. ............. 318/489 |
| 5,904,223 A | * | 5/1999 | Shimizu et al. ............. 180/443 |
| 5,907,277 A | | 5/1999 | Tokunaga ................... 340/441 |
| 6,453,226 B1 | * | 9/2002 | Hac et al. ...................... 701/48 |
| 6,470,250 B2 | * | 10/2002 | Nishizaki et al. ............. 701/48 |
| 6,505,108 B2 | * | 1/2003 | Bodie et al. ................... 701/41 |

\* cited by examiner

Primary Examiner—Lesley D. Morris
Assistant Examiner—Tony Winner
(74) Attorney, Agent, or Firm—Robert M. Sigler

(57) ABSTRACT

A variable power steering system for a motor vehicle is responsive to an activity signal from a vehicle stability enhancement (VSE) system and a lateral surface coefficient of friction estimator to modify steering assist in an amount dependent on the estimated surface coefficient when the vehicle stability enhancement system is active. The modification is phased in and out with slew limiting in steps also determined by the estimated lateral surface coefficient, with both the maximum modification and the step size varying inversely with lateral surface coefficient. The system preferably determines offset current values for the VSE system and estimated lateral acceleration, as well as for any other vehicle traction limit handling systems such as anti-lock braking (ABS) or traction control (TCS) and chooses the greatest in magnitude as a road surface adaptation offset current for addition to a vehicle speed offset current to provide a total current signal for the modification.

5 Claims, 4 Drawing Sheets

ADAPTIVE VARIABLE EFFORT POWER STEERING SYSTEM

TECHNICAL FIELD

The technical field of this invention is vehicle power steering systems.

BACKGROUND OF THE INVENTION

Basic power steering systems for vehicles provide a fixed steering assist offset curve regardless of driving conditions. More sophisticated power steering systems, however, are available that are capable of changing power steering effort in different driving situations. For example, one such system, marketed by Delphi Automotive Systems, provides a decrease in steering assist with vehicle speed, so that greater assist will be provided at very low speed vehicle maneuvers such as parking, while significantly less assist is provided at high speed highway driving for a tighter, "manual steering feel" and greater stability. In a recent version of this system, a variation responsive to estimated lateral acceleration has been added to improve steering linearity.

Another such system is described in U.S. Pat. No. 6,062,336, issued May 16, 2000 and entitled Adaptive Variable Effort Steering System. The power steering system described therein takes advantage of the advent of vehicle low friction road surface handling controls for vehicle brakes and/or suspension components to provide special control of power steering assist near or at the limit of vehicle handling. Such controls include anti-lock braking controls (ABS), traction controls (TCS) and vehicle stability enhancement (VSE) controls. Each of these controls responds to sensors indicating when a vehicle approaches or reaches a vehicle handling limit, where traction is decreased or lost, to override normal vehicle control while the normal handling is not optimal. The power steering system of U.S. Pat. No. 6,062,336 is responsive to signals from one or more such controls that indicate when the control has become active in modifying handling, and thus indicate the existence of a near limit or at limit vehicle handling situation. When such a handling limit signal is received in the system of the patent, the power steering system responds by decreasing steering assist, and thus increasing steering effort, to provide a more "manual" steering feel as long as the handling limit situation is indicated.

But vehicles with an adaptive power steering system as described do not experience loss of traction only on low coefficient road surfaces. They may also lose traction if driven in a "performance" mode (in aggressive or evasive maneuvers) on high coefficient surfaces. But on a high coefficient surface, high lateral forces can be generated on the tires and transmitted through the steering system to produce an inherent increase in steering effort; and an additional increase in steering effort can produce an unpleasant sensation to a driver, particularly at the initiation of a counter-steering input. Thus, the increase in steering effort beneficial in improving driver comfort near or at the handling limit on low coefficient of friction surfaces has proven to be unnecessary and undesirable in similar circumstances on high coefficient surfaces. To modify the added steering downward for the system's behavior on high coefficient surfaces can reduce its desired effect on low coefficient surfaces.

The system described in U.S. Pat. No. 6,062,336 is described as having embodiments responsive to variable vehicle dynamic parameters such as yaw rate error, in the case of a vehicle stability enhancement system, to provide a variable magnitude signal of approaching vehicle handling limit; but this signal does not distinguish between loss of traction on a low coefficient surface and loss of traction on a high coefficient surface.

SUMMARY OF THE INVENTION

A variable power steering system for a motor vehicle is responsive to an activity signal from a vehicle stability enhancement (VSE) system and a lateral surface coefficient of friction estimator to modify steering assist to provide a greater steering assist when the VSE system is active on a low coefficient surface than when the VSE system is active on a high coefficient surface. Thus, the power steering assist is automatically varied, when the vehicle stability enhancement system is active, to provide the optimal handling feel on both low coefficient and high coefficient surfaces.

Preferably the modification is phased in and out in slew limited steps that also decrease in size as lateral surface coefficient increases. In a preferred embodiment, a power steering assist correction comprises the sum of a vehicle speed offset value varying inversely with vehicle speed and a road surface adaptation value that is the greatest in magnitude of a plurality of offset values comprising a vehicle stability enhancement offset value determined as described above, a lateral acceleration offset value varying inversely with estimated lateral acceleration and offset values used during the activity of any other vehicle traction limit handling controls such as anti-lock braking (ABS) or traction control (TCS).

DESCRIPTION OF THE PREFERRED EMBODIMENT

Figure 1:
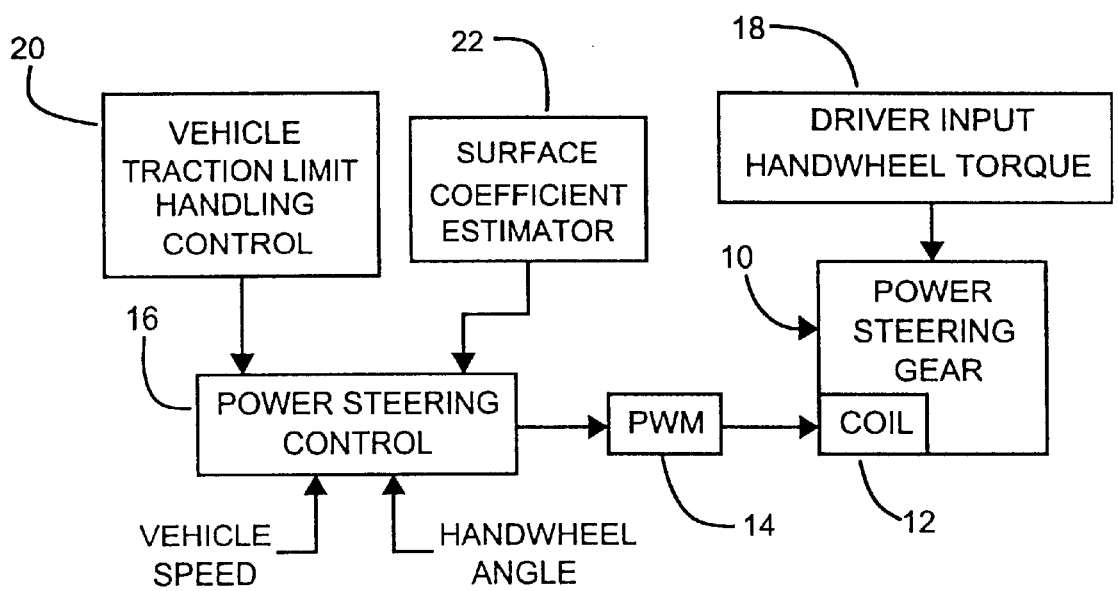
FIG. 1 is a block diagram of a vehicle power steering system according to the invention.

Referring to FIG. 1, a vehicle power steering gear 10 comprises a known steering mechanism, for example rack and pinion, controlled by a handwheel with a power assist apparatus responsive to driver input handwheel torque and a control signal to control the direction of vehicle steerable wheels, not shown. Power steering gear 10 may be any such mechanism known in the art providing the capability of controlling the power assist independently of driver input, preferably in response to an electric signal, and may provide hydraulic or electric power assist. A suitable mechanism for vehicle power steering gear is shown, for example, in U.S. Pat. No. 5,119,898, Electromagnetic Control Apparatus for Varying the Driver Steering Effort of a Hydraulic Power Steering System, issued Jun. 9, 1992 to Eckhardt et al, the disclosure of which is incorporated by reference. In the mechanism of this prior art patent, a pulse width modulated (PWM) control current is provided to a coil 12 for the generation of electromagnetic torque to modify the hydraulic assist torque generated within the power steering gear. The input PWM control current thus provides programmed, variable control of steering effort. It should be apparent to those skilled in the art that the apparatus of the invention would also be easily adaptable to any electronically controlled power steering system. In an electric power steering (EPS) system, for example, a signal indicating a correction current (torque in rotary electromagnetic devices) could be combined, such as by addition, with other such signals in the EPS control.

The PWM control current is generated by a PWM circuit apparatus 14 of known construction in response to an output signal from a power steering control 16, which may, as suggested in U.S. Pat. No. 5,119,898, be based on a programmed digital microcomputer. Thus, the program in power steering control 16 provides an output signal to PWM generating circuit 14, which provides a control current to coil 12 of power steering gear 10 to modify the power assist thereof to the driver input handwheel torque 18, provided by the vehicle operator through the handwheel.

Power steering control 16 receives several input signals required by the program. A vehicle speed signal is provided in a known manner from the vehicle's speedometer apparatus or otherwise from vehicle undriven wheel speeds. A handwheel angle signal is likewise provided from a suitable sensor. One or more vehicle traction limit handling signals are provided from vehicle traction limit handling controls, indicated collectively as 20. Controls 20 may be any that are responsive to vehicle body or wheel dynamics to provide enhancing or overriding control of one or more vehicle actuators such as engine, wheel brakes, suspension controllers, etc. in situations where loss of traction is evident. Examples of such a system include a vehicle anti-lock brake system (ABS) or a vehicle traction control system (TCS), in which vehicle brakes are automatically modulated when vehicle wheel slip is sensed. Another example is a vehicle stability enhancement (VSE) system in which the vehicle brakes or a vehicle suspension actuator is used to correct inappropriate vehicle yaw or other dynamic behavior associated with a reduction of traction between the vehicle wheels and the road surface. Each of these systems is designed to provide active control of the vehicle only during a period when vehicle dynamic behavior associated with reduction in traction is sensed; and this invention provides that a signal of this activity is provided as the output from the vehicle traction limit handling control 20 to power steering control 16. This signal is generally a binary flag indicating activity or no activity. Thus, for example, such a signal from an anti-lock brake system would be in a first state, indicating activity, and thus a vehicle handling limit, only while actually modulating brake pressure, and would otherwise be in a second state indicating normal vehicle handling. Likewise, such a signal from a vehicle stability enhancement system would be in a first state, indicating activity, only while controlling a vehicle chassis actuator such as a wheel brake or a controllable damper or similar actuator and would otherwise be in an second state indicating normal vehicle handling.

Figure 2:
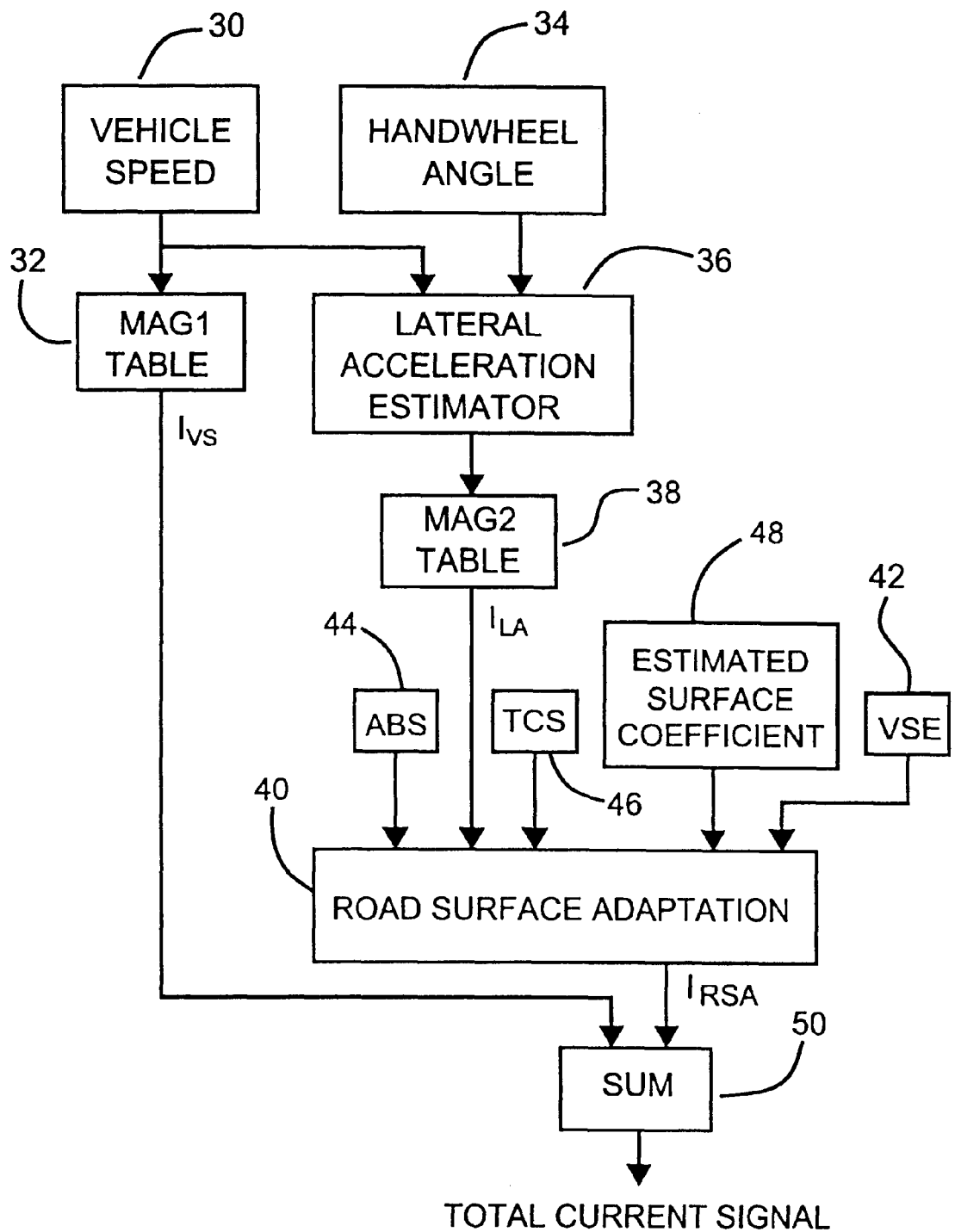
FIG. 2 is a block diagram of a power steering control for use in the vehicle power steering system of FIG. 1.

Power steering control 16 is shown in more detail, in block diagram form, in FIG. 2. A vehicle speed signal 30 is provided to a MAG1 look-up table 32, which outputs a vehicle speed offset current value $I_{VS}$. The values stored in MAG1 look-up table 32 are calibrated to produce a current in coil 12 that produces high steering assist at very low vehicle speeds, for easier vehicle parking and similar low speed maneuvers, but which increases, and thus reduces steering assist, at high vehicle speeds for a more manual steering feel and improved steering stability at highway speeds.

Vehicle speed signal 30 and a vehicle handwheel angle signal 34 are provided to an estimated vehicle lateral acceleration block 36 to derive an estimated vehicle lateral acceleration signal, which is provided to a MAG2 look-up table 38; and the latter outputs a vehicle lateral acceleration offset current value $I_{LA}$. The values stored in MAG2 look-up table 38 are calibrated to provide a current in coil 12 which increases, and therefore reduces steering assist, with lateral acceleration, thus improving steering linearity between steering effort and vehicle motion.

A road surface adaptation block 40 receives the lateral acceleration offset current value $I_{LA}$ from the MAG 2 table 38, as well as an estimated surface coefficient value LatMuEst from a surface coefficient estimator 48 and binary control activity signals from a vehicle stability enhancement (VSE) control and any other selected vehicle traction limit handling controls (ABS, TCS, etc). Road surface adaptation block 40 derives a vehicle traction limit handling current offset value for the VSE control from the binary VSE activity signal and the estimated surface coefficient value in accordance with this invention, and for each of the other vehicle traction limit handling controls from the associated activity flag and stored calibration constants. Each of the current offset values slew limited by being phased in and out in steps determined by calibrated constants or, in the case of the VSE current offset, in accordance with LatMuEst. The current offset values and the lateral acceleration correction current value are compared; and the one with the greatest magnitude is selected as a road surface adaptation current value $I_{RSA}$ and output to a summer 50, where it is added to the vehicle speed based current $I_{VS}$. The resulting sum is then provided to the pulse width modulator 14 to generate an appropriate current for coil 12 in the power steering gear 10.

z

The operation of the road surface adaptation block is described in more detail with reference to a computer flow chart shown in FIG. 3. The routine described therein begins at step 60 by estimating the lateral coefficient of surface adhesion LatMuEst between the vehicle tires and the road surface. This may be performed in the manner described in U.S. Pat. No. 6,035,251, issued Mar. 7, 2000 or in any other manner known in the art. A more robust method, which may provide greater accuracy, is described in U.S. Ser. No. 09/769,676, filed Jan. 25, 2001, issued Sep. 17, 2002 as U.S. Pat. No. 6,453,226 and assigned to the assignee of this application. The disclosure of that application is included by reference herein. The routine then proceeds to step 62, in which the value estimated in step 60 is quantized into one of several broad ranges on the basis of one or more calibration constants. For example, the total range could be divided by calibrated constants of 0.25 and 0.75 into three quantized levels: low (from 0 to 0.25, typical of icy and other very slippery surfaces), medium (from 0.25 to 0.75, typical of snow or gravel surfaces) and high (from 0.75 to 1.0, typical of dry, solid surfaces). The resolution of the quantization is not critical; and the value of LatMuEst need only be reasonably accurate.

The computer running the routine being described has access to memory in which a plurality of lookup tables store calibrated constants. The constants are calibrated for a vehicle in which the system is to be installed; and the memory is fixed in the manufacture of the system or the vehicle in which the system is installed. The quantized level of LatMuEst is the lookup value for several stored, calibrated values in one of these lookup tables used during activity of the vehicle stability enhancement (VSE) control. These values are (1) a maximum current offset MaxI$_{VSE}$ for use during VSE control activity, (2) a slew in stepping value to control the rate of increase of current offset I$_{VSE}$ on its way to MaxI$_{VSE}$ when VSE control activity is initiated, and (3) a slew out stepping value to control the rate of decrease of current offset I$_{VSE}$ as it is phased out when VSE control activity is ended. Generally, the magnitudes of all three values decrease as the quantized level of LatMuEst increases.

Lookup tables are also provided for a maximum current offset, slew in step and slew out step corresponding to any other vehicle traction limit handling systems on the vehicle, such as ABS and TCS; but in this embodiment these tables have only a single, fixed value for each parameter. The VSE control is the only vehicle traction limit handling control having an offset current parameter varying in value with LatMuEst.

The routine proceeds next to step 64, in which it updates offset current values using the calibration values retrieved from the look-up tables and the activity flags of the various vehicle traction limit handling controls. The updating of offset current $I_{VSE}$ will be described as an example, with respect to the flow chart of FIG. 4.

Figure 4:
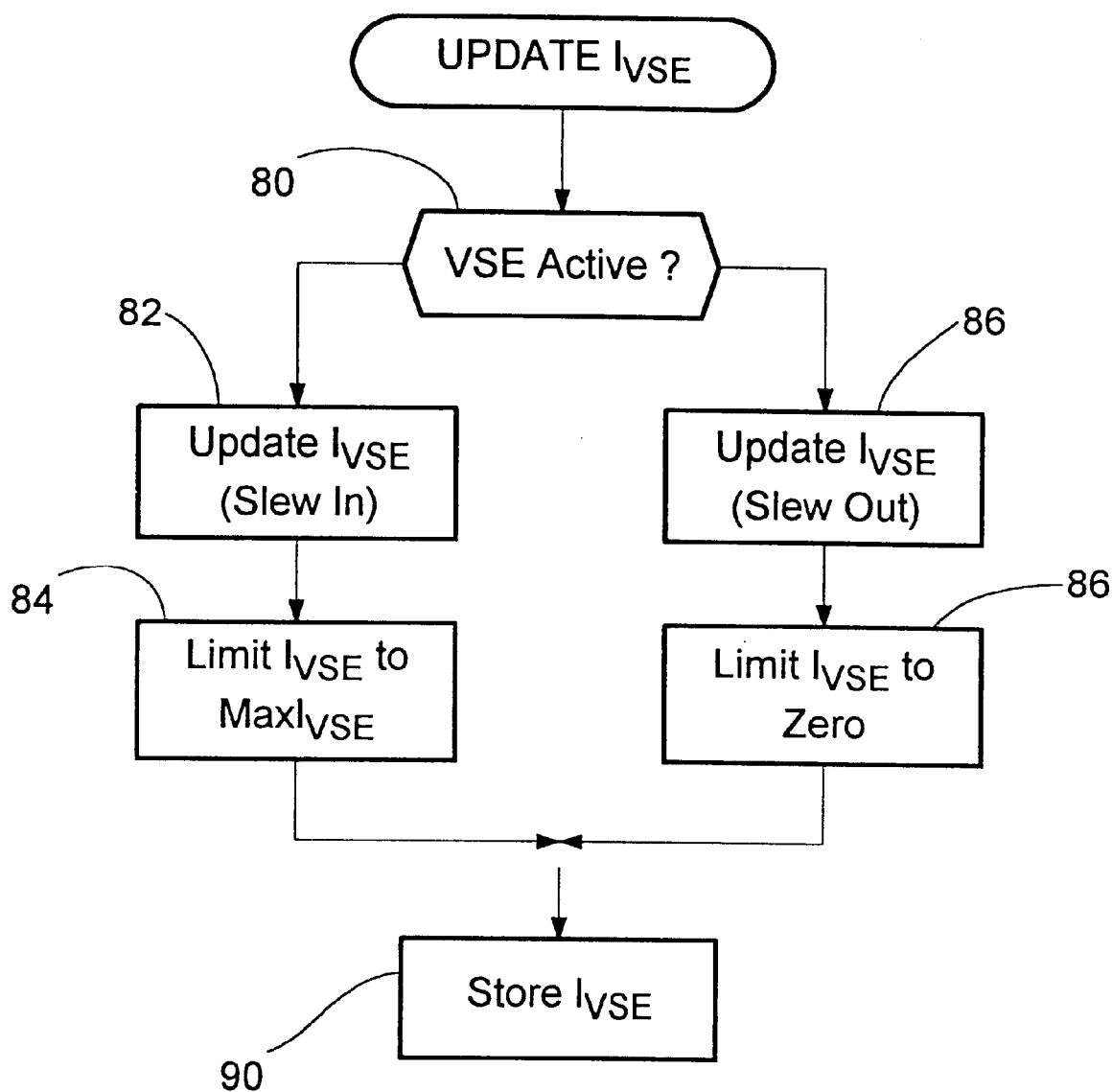

The subroutine described by FIG. 4 begins by examining the VSE Active flag at step 80. If it shows VSE activity, the subroutine determines the value of offset current $I_{VSE}$ by first adding, at step 82, a slew limited value equal to the product of a LatMuEst derived slew in step value $SlewIn_{VSE}$ and a predetermined Looptime constant indicative of the time period between consecutive updates:

$$I_{VSE}=I_{VSE}+(SlewIn_{VSE})(Looptime).$$

At step 84, this value is then limited to the LatMuEst determined value of $MaxI_{VSE}$. The updated value of $I_{VSE}$ is then stored in memory at step 90. Thus the value of $MaxI_{VSE}$ determines the final magnitude of $I_{VSE}$ as it is phased in at the beginning of VSE control activity.

Referring again to step 80, if the VSE Active flag does not show VSE activity, the subroutine determines the value of offset current $I_{VSE}$ by first subtracting, at step 86, a slew limited value equal to the product of the LatMuEst derived slew out step constant $SlewOut_{VSE}$ and the predetermined Looptime constant:

$$I_{VSE}=I_{VSE}-(SlewOut_{VSE})(Looptime).$$

At step 84, this value is then limited to zero. The updated value of $I_{VSE}$ is then stored in memory at step 90. Thus the value of $MaxI_{VSE}$ determines the final magnitude of $I_{VSE}$ as it is phased out at the end of VSE control activity.

A similar process is performed for other vehicle traction limit handling control associated offset currents such as $I_{ABS}$ and $I_{TCS}$, except that the maximum value, slew-in step value and slew-out step value are predetermined in memory in this embodiment rather than being based on estimated surface coefficient LatMuEst. This is due to the fact that the ABS and TCS controls are more associated with longitudinal friction between the tire and road surface rather than lateral friction.

Figure 3:
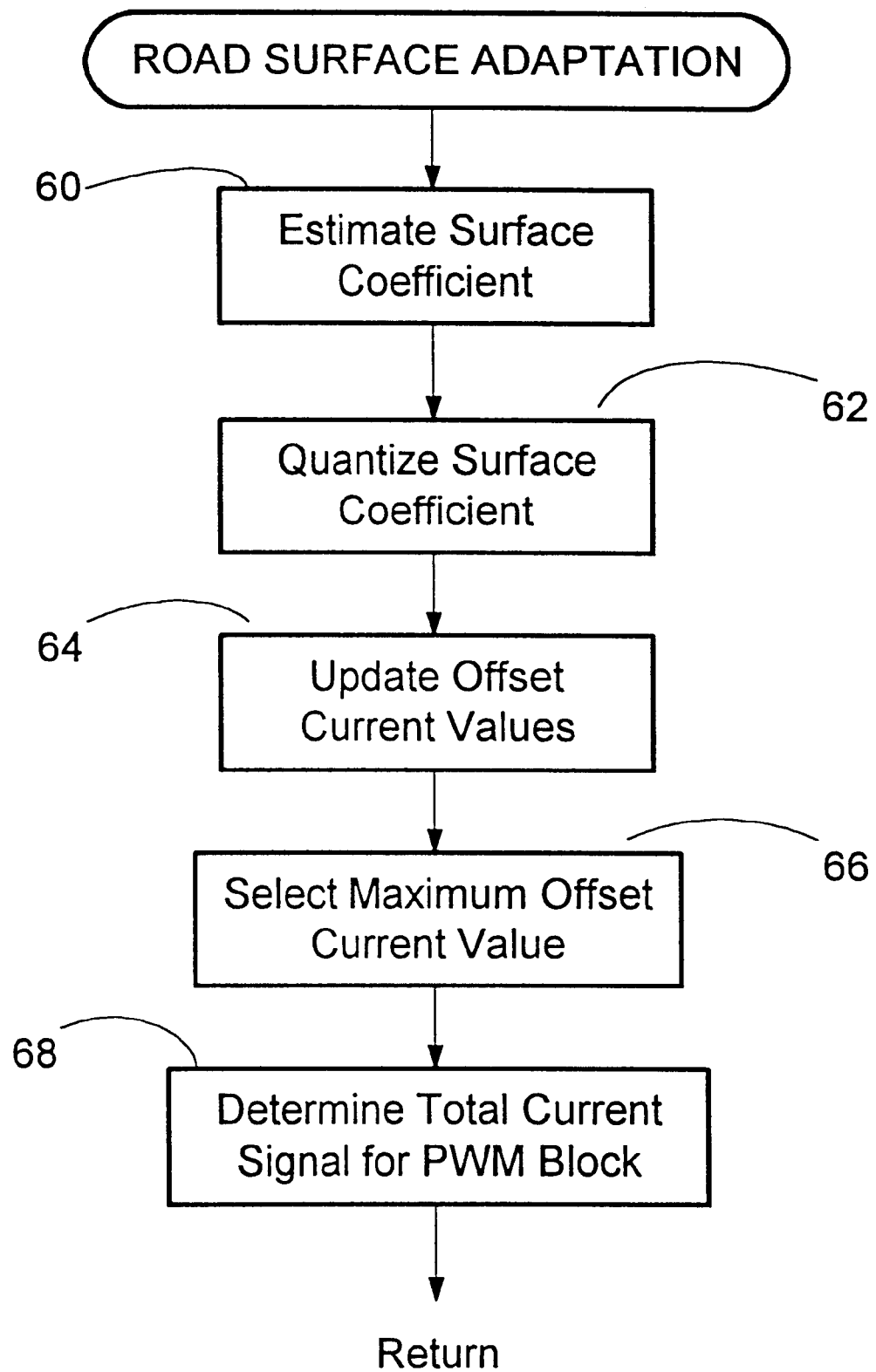
FIGS. 3 and 4 are flow charts describing the operation of a road surface adaptation according to the invention for use in the power steering control of FIG. 2.

Returning to the flow chart of FIG. 3, the subroutine next, after updating the values of the offset currents, proceeds to step 66, in which the offset current value with the greatest magnitude is selected as the road surface adaptation current signal $I_{RSA}$ and added to current $I_{VS}$ to provide the total current signal $I_{MAG}$ for PWM block 14. It can be seen that, when there is no offset current due to any vehicle traction limit handling control activity, the largest (indeed the only) offset current will be $I_{LA}$; and the total current signal will be the same as that provided by the prior art: the sum of $I_{VS}$ and $I_{LA}$. Similarly, when an offset current from one of the vehicle traction limit handling controls other than a VSE control is present, the resulting total current signal is modified essentially as described in the prior art U.S. Pat. No. 6,062,336. But when the VSE control is active, the resulting total current signal is modified by a value derived from an estimated surface coefficient of adhesion. The VSE Active flag is sufficient to signal a loss of traction; but the surface coefficient signals whether that loss of traction occurs on a low coefficient road surface or on a high coefficient surface; and the use of the surface coefficient, rather than yaw rate error or some similar parameter not specifically indicative of surface coefficient, enables the system to adjust the power steering assist accordingly.

What is claimed is:

1. An adaptive variable power steering system for a motor vehicle comprising steerable wheels for operating on roads having variable road surface friction, the vehicle having a vehicle stability enhancement control automatically activated in a vehicle traction limit handling situation to maintain vehicle directional stability, the power steering system comprising, in combination:

means for generating an assist torque in response to sensed handwheel input torque;

a vehicle lateral surface coefficient estimator;

means responsive to a lateral surface coefficient signal received from the vehicle lateral surface coefficient estimator for generating a vehicle stability offset current value having a magnitude determined from the lateral surface coefficient signal, the means generating the vehicle stability offset current value when the vehicle stability enhancement control signals its activation;

means for generating a lateral acceleration offset signal value indicative of vehicle lateral acceleration;

a maximum value selector applied to the vehicle stability offset current value and at least the lateral acceleration offset current value, whereby the largest one of the offset current values is selected; and means for modifying the assist torque in response to the selected largest one of the offset values, whereby modifications to the assist torque responsive to activation of the vehicle stability enhancement control have a magnitude dependent on the estimated surface coefficient.

2. An adaptive variable power steering system according to claim 1 wherein the magnitude of the vehicle stability offset current value varies inversely with the magnitude of the estimated surface coefficient.

3. A method for controlling a variable power steering system for a motor vehicle having steerable wheels for operating on roads with variable road surface friction and a vehicle stability enhancement control automatically activated in a vehicle traction limit handling situation to maintain vehicle directional stability, the method comprising the steps:

generating an assist torque in response to sensed handwheel input torque;

estimating a vehicle lateral surface coefficient;

when the vehicle stability enhancement control signals its activation, generating a vehicle stability offset current value having a magnitude greater at a first predetermined value of the lateral surface coefficient signal than at a second, larger predetermined value of the lateral surface coefficient signal; and selectively decreasing the assist torque in response to the vehicle stability offset current value.

4. The method of claim 3 further comprising the step of slew limiting the decrease of the assist torque in response to the vehicle stability offset current at a rate responsive to the lateral surface coefficient.

5. The method of claim 3 further comprising the steps of:

generating a lateral acceleration offset signal value indicative of vehicle lateral acceleration; and modifying the assist torque in response to the larger one of the vehicle stability offset current value and the lateral acceleration offset current value.

\* \* \* \* \*